United States Patent
Sergent et al.

(10) Patent No.: US 7,312,457 B2
(45) Date of Patent: Dec. 25, 2007

(54) SPECTROMETER WITH CHARGE-CARRIER-TRAPPING CORRECTION

(75) Inventors: Frank Sergent, Knoxville, TN (US); Jesse Ursery, Knoxville, TN (US); Rex C. Trammell, Andersonville, TN (US)

(73) Assignee: Advanced Measurement Technology, Inc., Oak Ridge, TN (US)

( * ) Notice: Subject to any disclaimer, the term of this patent is extended or adjusted under 35 U.S.C. 154(b) by 24 days.

(21) Appl. No.: 11/119,618

(22) Filed: May 2, 2005

(65) Prior Publication Data

US 2006/0243916 A1   Nov. 2, 2006

(51) Int. Cl.
*G01T 1/24* (2006.01)
(52) U.S. Cl. ................................ 250/370.06
(58) Field of Classification Search ............ 250/370.06
See application file for complete search history.

(56) References Cited

U.S. PATENT DOCUMENTS

| | | | | |
|---|---|---|---|---|
| 4,937,452 A | * | 6/1990 | Simpson et al. | 250/370.06 |
| 5,821,538 A | * | 10/1998 | De Antoni et al. | 250/370.01 |
| 5,872,363 A | * | 2/1999 | Bingham et al. | 250/363.01 |

* cited by examiner

*Primary Examiner*—Constantine Hannaher
(74) *Attorney, Agent, or Firm*—Pitts & Brittian, PC (57) ABSTRACT

A spectrometer having improved energy resolution by correcting for error introduced by charge carrier trapping. By monitoring the shape of the pulses produced by the detector, a digital filter is adjusted to improve the energy resolution. The adjustment is performed manually by an operator or automatically by an automatic optimizer circuit that modifies the digital filter until the spectral peaks have a width and shape matching the desired characteristics, which are a minimum width and a substantially symmetrical shape. By correcting for the energy loss associated with long rise time events, the charge-trapping correcting spectrometer produces spectral peaks with improved energy resolution.

20 Claims, 6 Drawing Sheets

SPECTROMETER WITH CHARGE-CARRIER-TRAPPING CORRECTION

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates to an improved gamma-ray spectrometer. More specifically, the present invention relates to a gamma-ray spectrometer incorporating a method of improving the energy resolution of detectors whose energy resolution is degraded because of charge carrier trapping.

2. Description of the Related Art

The germanium detector is the most commonly used high-resolution gamma-ray detector. When the germanium detector absorbs a gamma-ray photon, free electrons and holes are produced. The number of electrons and holes produced is proportional to the gamma-ray energy. The associated electronics collects the electrons and holes producing a signal proportional to the gamma-ray energy. The energy spectrum of the system is a histogram of the number of measured events versus the recorded energy. The width of the line in the energy spectrum caused by a mono-energetic gamma-ray source is called the energy resolution of the system. The width of the line is usually measured at the point where the number of counts is half of the maximum in the peak and is referred to as the Full Width at Half Maximum (FWHM).

Only the electronic noise and the statistical variation in the collected charge would limit the energy resolution of a perfect detector. In addition to electronic noise and statistical variations, the energy resolution of real detectors is degraded when some of the free charge carriers are trapped before reaching the collecting electrodes. The fraction of the charge signal that is lost depends on the point of interaction of the gamma-ray inside the germanium crystal and thus varies from event to event producing an increase in the FWHM.

U.S. Pat. No. 4,937,452, entitled "Charge Trapping Correction in Photon Detector Systems," issued to Michael L. Simpson, et al., on Jun. 26, 1990 shows an analog spectrometer that corrects for the trapped charge and improves the energy resolution. Although the energy resolution is improved, the Simpson device requires the manual adjustment of two independent parameters to match the specific detector being used.

BRIEF SUMMARY OF THE INVENTION

A gamma-ray spectrometer incorporating a method of improving the energy resolution of detectors whose energy resolution is degraded because of charge carrier trapping is shown and described. By monitoring the shape of the pulses produced by the detector, a digital filter is adjusted to improve the energy resolution. The adjustment is performed manually by an operator or automatically by an automatic optimizer circuit that modifies the digital filter until the spectral peaks have a width and shape matching the desired characteristics, which are a minimum width and a substantially symmetrical shape. By correcting the width and shape of the spectral peaks, the energy resolution improves. The digital filter, as modified by manually by an operator or automatically by an automatic optimizer circuit, applies a fine gain control to individual pulses corresponding to particular rise-times. By correcting for the energy loss associated with long rise time events, the charge-trapping correcting spectrometer produces spectral peaks with improved energy resolution.

The charge-trapping correcting spectrometer includes a germanium detector that detects gamma-ray photons emitted by a radiation source. An analog processing circuit processes the charge collected by the detector and produces a voltage proportional to the collected charge. Optionally, the analog processing circuit provides amplification and pulse shaping to match the characteristics of the sampling analog-to-digital converter (ADC). The sampling ADC samples and digitizes the analog voltage from the analog processing circuit and produces a series of digital numbers proportional to the instantaneous output of the analog processing circuit. The digital output of the ADC is passed to a digital filter. The digital filter produces an output whose amplitude is proportional to the total charge collected by the germanium detector. The output of the digital filter is used as a pointer into a histogram memory. More specifically, the histogram memory uses the peak amplitude of the output of the digital filter to increment the data memory element corresponding to that amplitude. The result of many such measurements is the spectrum of radiation emitted by the radiation source. The spectrum is displayed for an operator on a display.

The parameters of the digital filter are selected to minimize the effects of electronic noise on the output amplitude consistent with the need to provide high data rates from the system. Additionally, the digital filter is designed to produce an output that is proportional to the total charge collected but independent of the detector rise time. The response of digital filter to a very short rise time step pulse, referred to as the filter weighting function, is usually a trapezoid. The peak amplitude of the trapezoid is the best estimate of the energy of the radiation emitted by the radiation source.

A pulse shape analyzer produces a digital output proportional to selected parameters of the digitized pulse from the sampling ADC. In the simplest case, the output from the pulse shape analyzer is a number proportional to the rise time of the detector. The gamma-ray spectrometer replaces the conventional digital filter with a digital filter having the capability to increase the amplitude of the output from the digital filter according to a programmed charge-carrier-trapping correction function using an input from the pulse shape analyzer. If the programmed charge-carrier-trapping correction function is correct for the detector in use then the total spectrum has a width close to the theoretically predicted value.

In one embodiment, the programmed charge-carrier-trapping correction function is entered by input from an operator. The operator makes an estimate of the function parameters and observes the resulting spectral shape and width on the display. The operator continues to modify the programmed charge-carrier-trapping correction function until the results are acceptable.

The addition of an automatic optimizer circuit eliminates the need for the operator to observe the output of the spectrometer and manually adjust the digital filter. The automatic optimizer circuit takes inputs from the pulse shape analyzer and examines the output from the digital filter in a region around a selected spectral peak. The automatic optimizer circuit modifies the programmed charge-carrier-trapping correction function in the digital filter to minimize the width of the selected peak. Using a simple algorithm similar to an automatic gain stabilizer, the automatic optimizer circuit examines the output of the digital filter to see if it is in a selected region centered on a specified energy. If the output of the digital filter is less than the center of the selected region, the gain of the digital filter for the observed output from the pulse shape analyzer is incremented by a small amount. If the output of the digital filter is greater than the center of the selected region, the gain of the digital filter for the observed value of the pulse shape analyzer is decreased by a small amount. After many events are processed, the programmed charge collection function includes a gain factor depending on the observed pulse shape. The gain factor tends to place the centroid of the spectrum produced for each pulse shape in the same channel, thus decreasing the effects of charge carrier trapping and improving the energy resolution.

BRIEF DESCRIPTION OF THE SEVERAL VIEWS OF THE DRAWINGS

The features of the invention will become more clearly understood from the following detailed description of the invention read together with the drawings.

DETAILED DESCRIPTION OF THE INVENTION

A gamma-ray spectrometer incorporating a method of improving the energy resolution of detectors whose energy resolution is degraded because of charge carrier trapping is shown and described at 400 in the figures. By monitoring the shape of the pulses produced by the detector, a digital filter is adjusted to improve the energy resolution. The adjustment is performed manually by an operator or automatically by an automatic optimizer circuit that modifies the digital filter until the spectral peaks have a width and shape matching the desired characteristics, which are a minimum width and a substantially symmetrical shape. By correcting the width and shape of the spectral peaks, the energy resolution improves. The digital filter, as modified by manually by an operator or automatically by an automatic optimizer circuit, applies a fine gain control to individual pulses corresponding to particular rise-times. By correcting for the energy loss associated with long rise time events, the charge-trapping correcting spectrometer produces spectral peaks with improved energy resolution.

Figure 1:
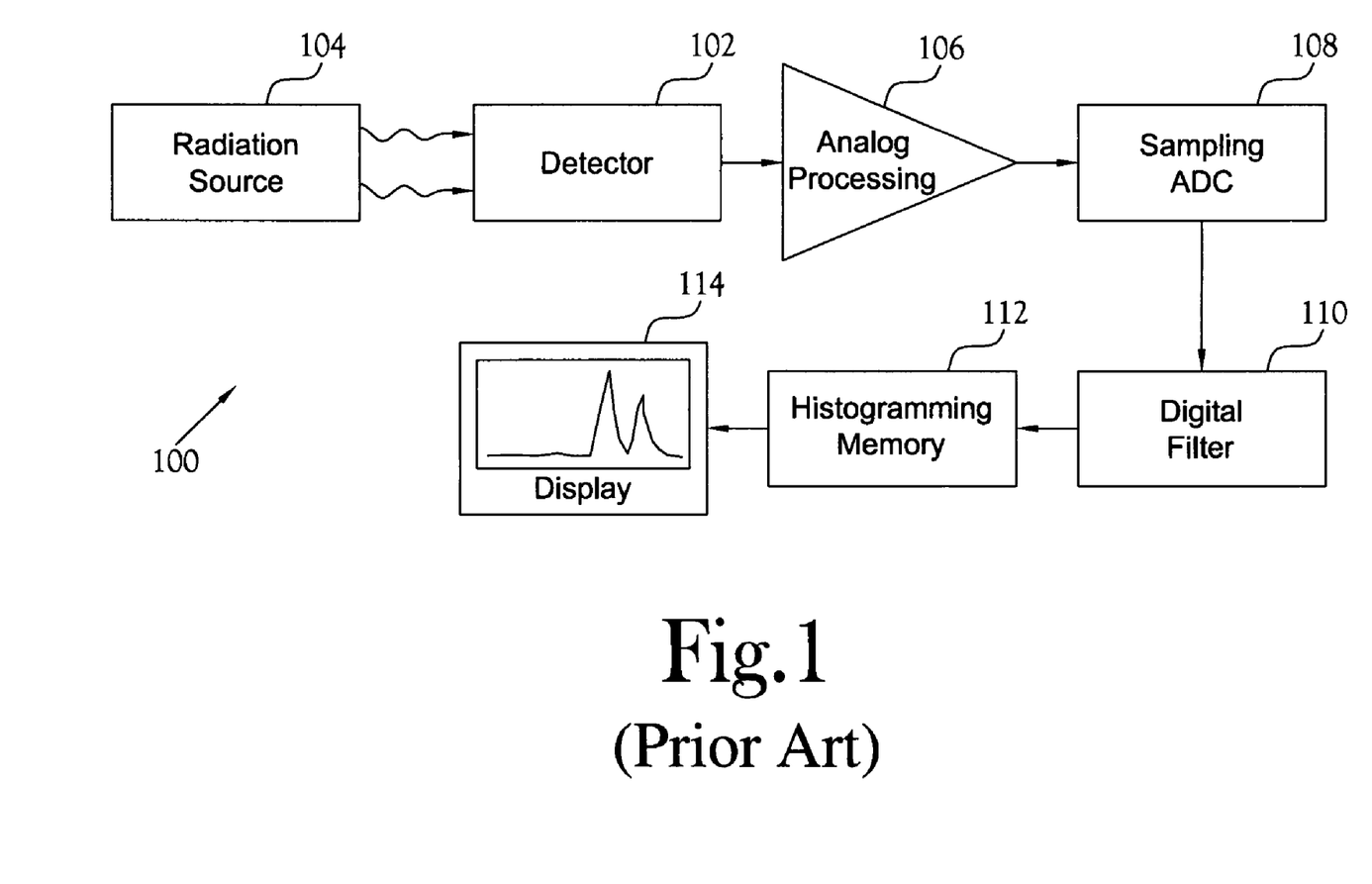
FIG. 1 is a block diagram of a digital spectrometer according to the prior art.

FIG. 1 illustrates a conventional gamma-ray spectrometer 100. The prior art spectrometer 100 includes a germanium detector 102 that detects gamma-ray photons emitted by a radiation source 104. An analog processing circuit 106 processes the charge collected by the detector 102 and produces a voltage proportional to the collected charge. Optionally, the analog processing circuit 106 provides amplification and pulse shaping to match the characteristics of the sampling analog-to-digital converter (ADC) 108. The sampling ADC 108 samples and digitizes the analog voltage from the analog processing circuit 106 and produces a series of digital numbers proportional to the instantaneous output of the analog processing circuit 106. The digital output of the ADC 108 is passed to a digital filter 110. The digital filter 110 produces an output whose amplitude is proportional to the total charge collected by the germanium detector 102. The output of the digital filter 110 is used as a pointer into a histogram memory 112. More specifically, the histogram memory 112 uses the peak amplitude of the output of the digital filter 110 to increment the data memory element corresponding to that amplitude. Typically, histogram memory 112 has 16,000 words of memory, each word corresponding to a specific output from the digital filter 110, which in turn relates to a specific energy observed by the detector 102. The result of many such measurements is the spectrum of radiation emitted by the radiation source 104. The spectrum is usually displayed for an operator on a display 114.

The parameters of the digital filter 110 are selected to minimize the effects of electronic noise on the output amplitude consistent with the need to provide high data rates from the system. Additionally, the digital filter 110 is designed to produce an output that is proportional to the total charge collected but independent of the detector rise time. The response of digital filter 110 to a very short rise time step pulse, referred to as the filter weighting function, is usually a trapezoid. The peak amplitude of the trapezoid is the best estimate of the energy of the radiation emitted by the radiation source 104.

Each time a gamma-ray photon is absorbed by the germanium detector 102, one count is added to the location in the histogram memory 112 corresponding to the measured amplitude of the charge signal. After many such events have been recorded, the histogram memory 112 contains the spectrum of the gamma-ray radiation seen by the germanium detector 102. Individual lines in the spectrum correspond to discrete gamma-ray energies in the radiation field. The spectral lines have a finite width even when the gamma-ray photons are mono-energetic. The width of the spectral lines is determined by electronic noise, statistical variation in the number of electrons and holes produced in the crystal, and charge carrier trapping. The degradation of energy resolution caused by charge carrier trapping varies from detector to detector, primarily because of differences in crystal quality and purity.

Figure 2:
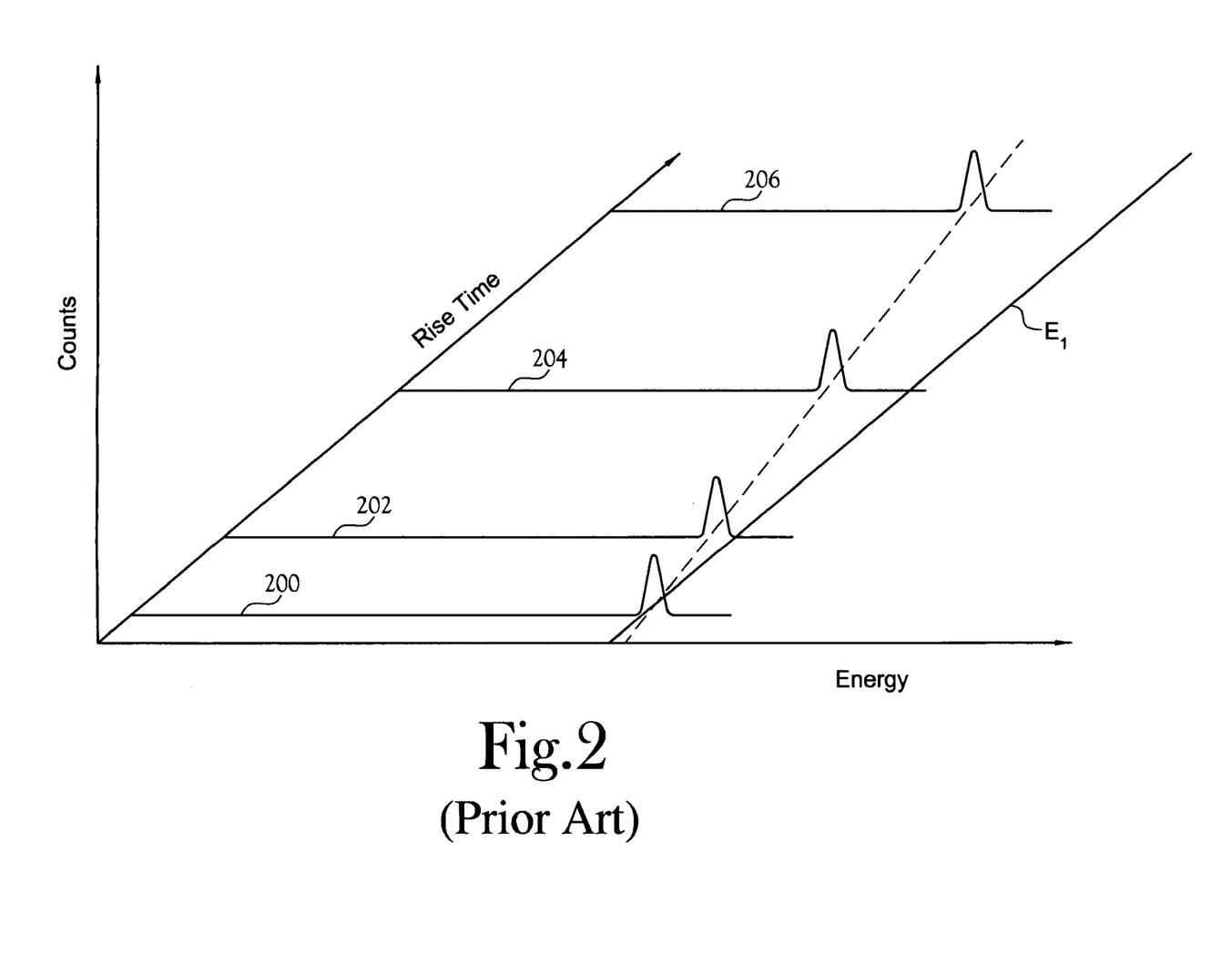
FIG. 2 depicts the variation in amplitude produced by detector pulses having varying rise times and thus varying amounts of charge carrier trapping as seen by prior art spectrometers.

FIG. 2 shows the variation in the spectra produced by a prior art spectrometer having a radiation detector exhibiting charge carrier trapping when exposed to a mono-energetic radiation source 104 having an energy $E_1$. In many detectors, the charge collected decreases as the rise time increases because charge carriers are held up from reaching an electrode and arrive too late to be taken into account by the electronics of the spectrometer. A first spectrum 200 corresponds to a short rise time from detector 102. The maximum amplitude of the first spectrum 200 is correctly recorded at energy $E_1$. A second spectrum 202 is produced by a somewhat longer rise time. The amplitude is somewhat reduced from the correct value $E_1$. Similarly, a third spectrum 204 and a fourth spectrum 206 show further loss of amplitude as the rise time increases. In a detector free from charge carrier trapping, the spectral peak would be at $E_1$ for all rise times. The amount of deviation from the correct value $E_1$ varies from detector to detector depending on the crystal properties.

Figure 3:
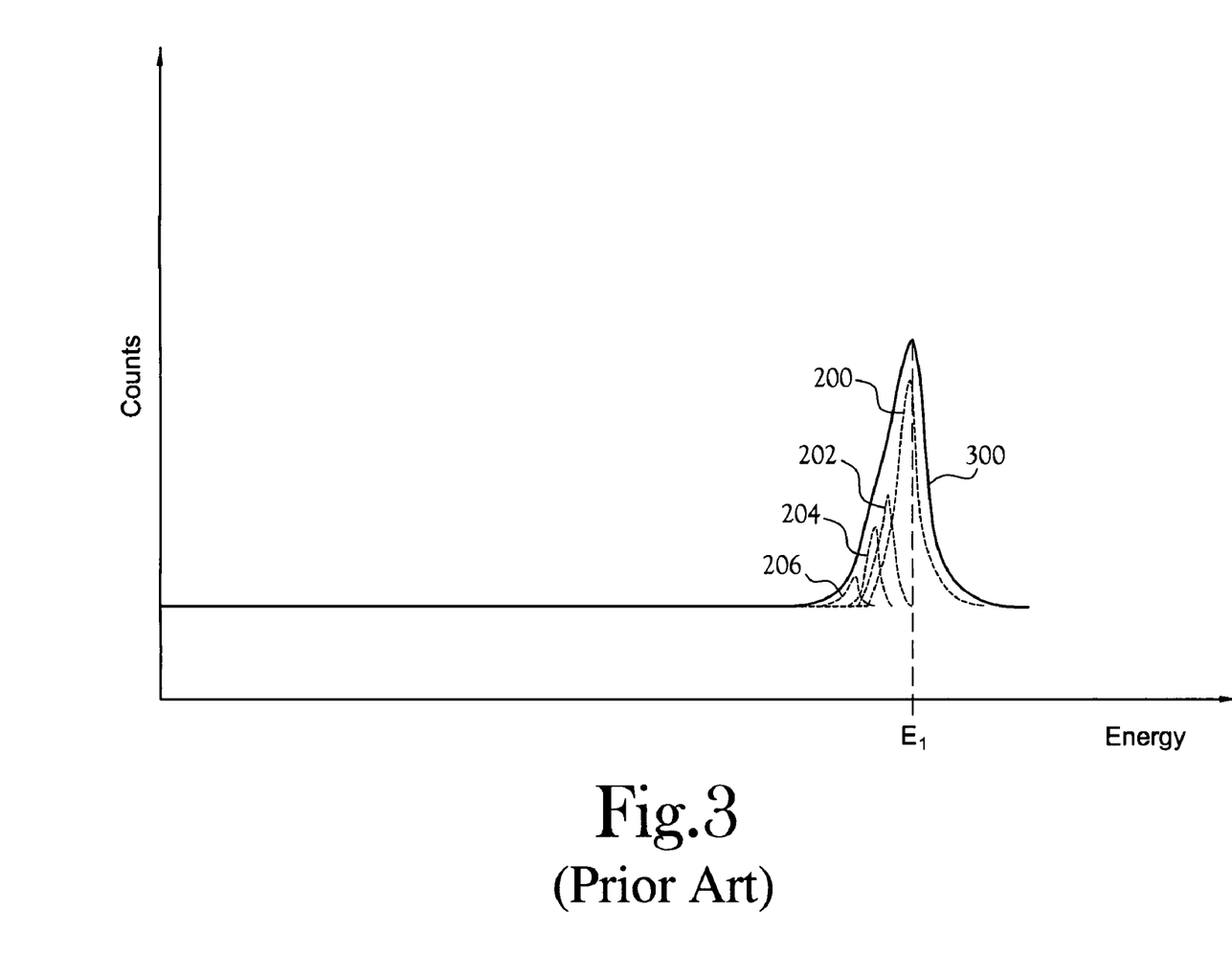
FIG. 3 depicts the spectral degradation caused by charge carrier trapping as seen by prior art spectrometers.

FIG. 3 shows the spectral degradation seen by a prior art spectrometer resulting from the charge carrier trapping depicted in FIG. 2. The spectra 200, 202, 204, 206 of FIG. 2 at various rise-times and exhibiting offsets due to charge carrier trapping are graphed to relate number of counts to the energy observed. The sum of the spectra 200, 202, 204, 206 for all possible rise times weighted by the volume of the detector having that rise time defines the total spectrum 300. In the absence of charge carrier trapping, the total spectrum 300 would have a Gaussian shape. However, as illustrated in FIG. 3, the total spectrum 300 has the often-observed low-side tailing and is broader than predicted by the electronic noise and charge carrier generation statistics.

Figure 4:
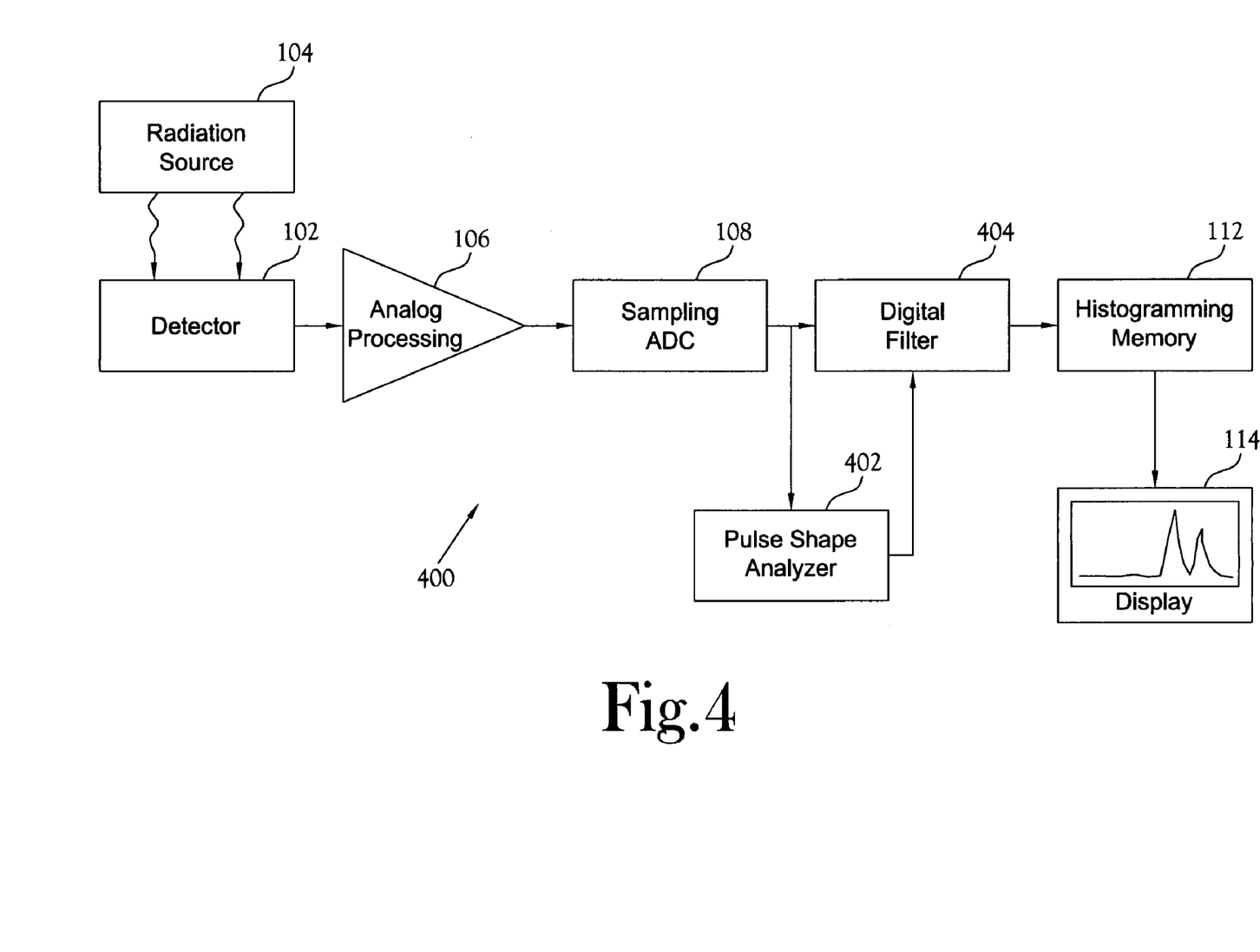
FIG. 4 depicts an improved digital spectroscopy system using pulse shape analysis to reduce the spectral degradation due to trapping.

FIG. 4 shows a charge-trapping correcting spectrometer 400 in which the effects of charge carrier trapping are reduced. The charge-trapping correcting spectrometer 400 adds a pulse shape analyzer 402 to the conventional spectrometer 100 of FIG. 1. The pulse shape analyzer 402 produces a digital output proportional to selected parameters of the digitized pulse from the sampling ADC 108. In the simplest case, the output from the pulse shape analyzer 402 is a number proportional to the rise time of the detector 102. The gamma-ray spectrometer 400 replaces the conventional digital filter 110 with a digital filter 404 having an input for the usual pulse amplitude information from the sampling ADC 108 and an additional input for pulse shape information from the pulse shape analyzer 402. The digital filter 404 has the capability to increase the amplitude of the output from the digital filter 404 according to a programmed charge-carrier-trapping correction function using an input from the pulse shape analyzer 402. The output of the digital filter 404 depends on both the amplitude and pulse shape information to minimize the effects of charge carrier trapping and improve energy resolution. It is often the case that the amount of charge carrier trapping for a specific pulse correlates with the shape of the pulse. For example, longer rise time pulses might indicate that the carriers traveled a longer distance and were thus more likely to be trapped. If the programmed charge-carrier-trapping correction function is correct for the detector 102 in use then the total spectrum 300 has a width close to the theoretically predicted value.

In one embodiment, the programmed charge-carrier-trapping correction function of the digital filter 404 is entered by an operator. The operator makes an estimate of the function parameters and observes the resulting spectral shape and width on the display 114. The operator continues to modify the programmed charge-carrier-trapping correction function of the digital filter 404 until the results are acceptable.

Figure 5:
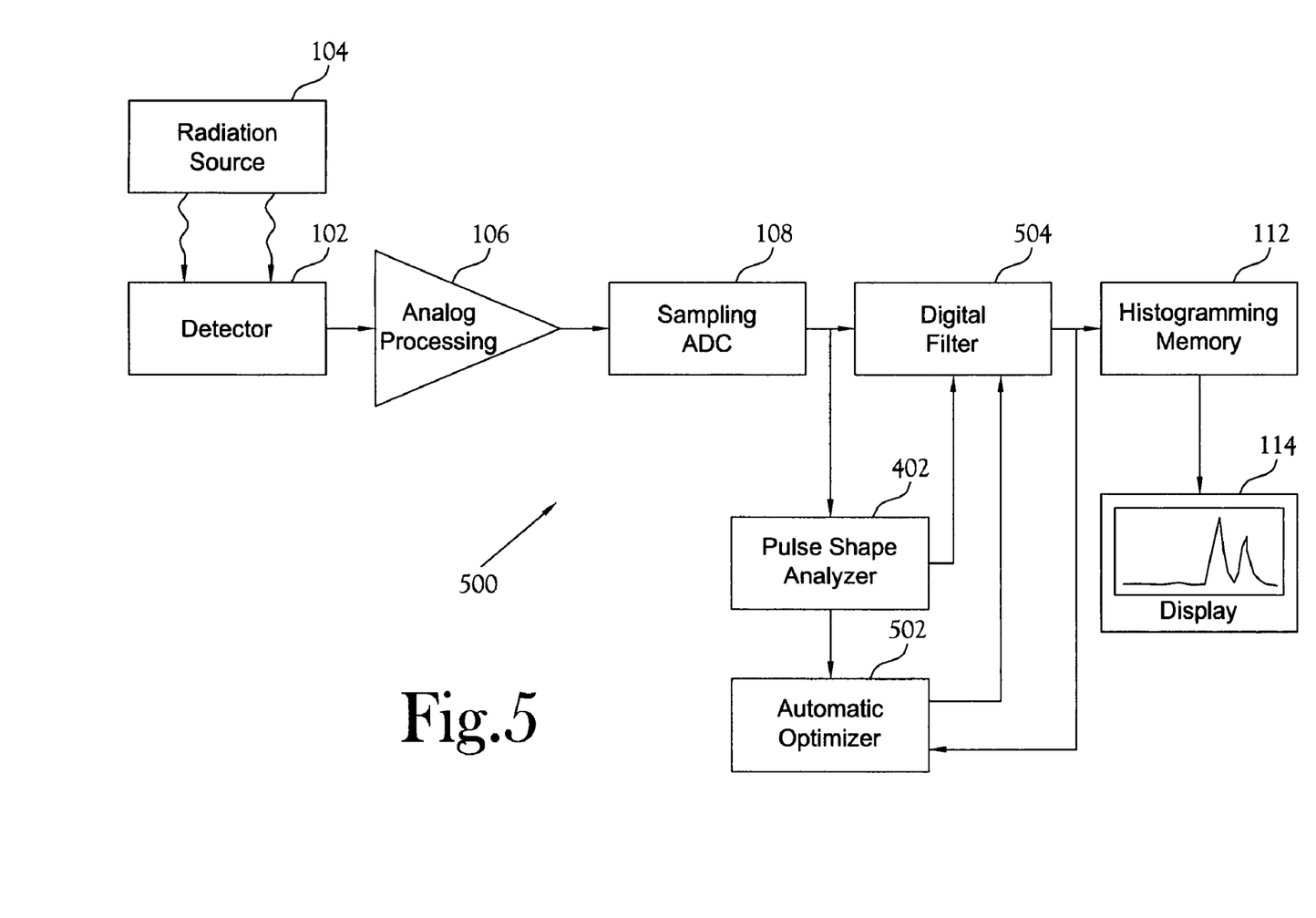
FIG. 5 depicts an improved digital spectroscopy system using pulse shape analysis to reduce spectral degradation due to trapping and having the additional feature of an automatic optimizer of the digital filter parameters to match the current detector.

FIG. 5 shows an alternate embodiment of the charge-trapping correcting spectrometer 500. The charge-trapping correcting spectrometer 500 adds an automatic optimizer circuit 502 to the embodiment of FIG. 4. The automatic optimizer circuit 502 that adjusts the parameters of the digital filter 504 to match the germanium detector 102 thus producing improved resolution with little effort by the operator. The digital filter 504 is updated to utilize information from the automatic optimizer circuit 502. The automatic optimizer circuit 502 takes inputs from the pulse shape analyzer 402 and examines the output from the digital filter 504 in a region around a selected spectral peak. The automatic optimizer circuit 502 modifies the programmed charge-carrier-trapping correction function in the digital filter 504 to minimize the width of the selected peak.

In one embodiment, the automatic optimizer circuit 502 uses a simple algorithm similar to an automatic gain stabilizer. The output of the digital filter 504 is examined to see if it is in a selected region centered on a specified energy. If the output of the digital filter 504 is less than the center of the selected region, the gain of the digital filter 504 for the observed output from the pulse shape analyzer 402 is incremented by a small amount. If the output of the digital filter 504 is greater than the center of the selected region, the gain of the digital filter 504 for the observed value of the pulse shape analyzer 402 is decreased by a small amount. After many events are processed, the programmed charge collection function includes a gain factor depending on the observed pulse shape. The gain factor tends to place the centroid of the spectrum produced for each pulse shape in the same channel, thus decreasing the effects of charge carrier trapping and improving the energy resolution.

As previously discussed, in a perfect spectrometer each spectral peak measured by the charge-trapping correcting spectrometer would be centered about the appropriate energy and would have the minimum width and a symmetric shape. Real world spectrometers are plagued by noise and statistical variations causing the spectral peaks to be broader and not symmetric. For spectrometers using germanium-based and other similar detectors, charge-carrier trapping contributes to the increased width and non-symmetric shape of the spectral peaks.

Figure 6:
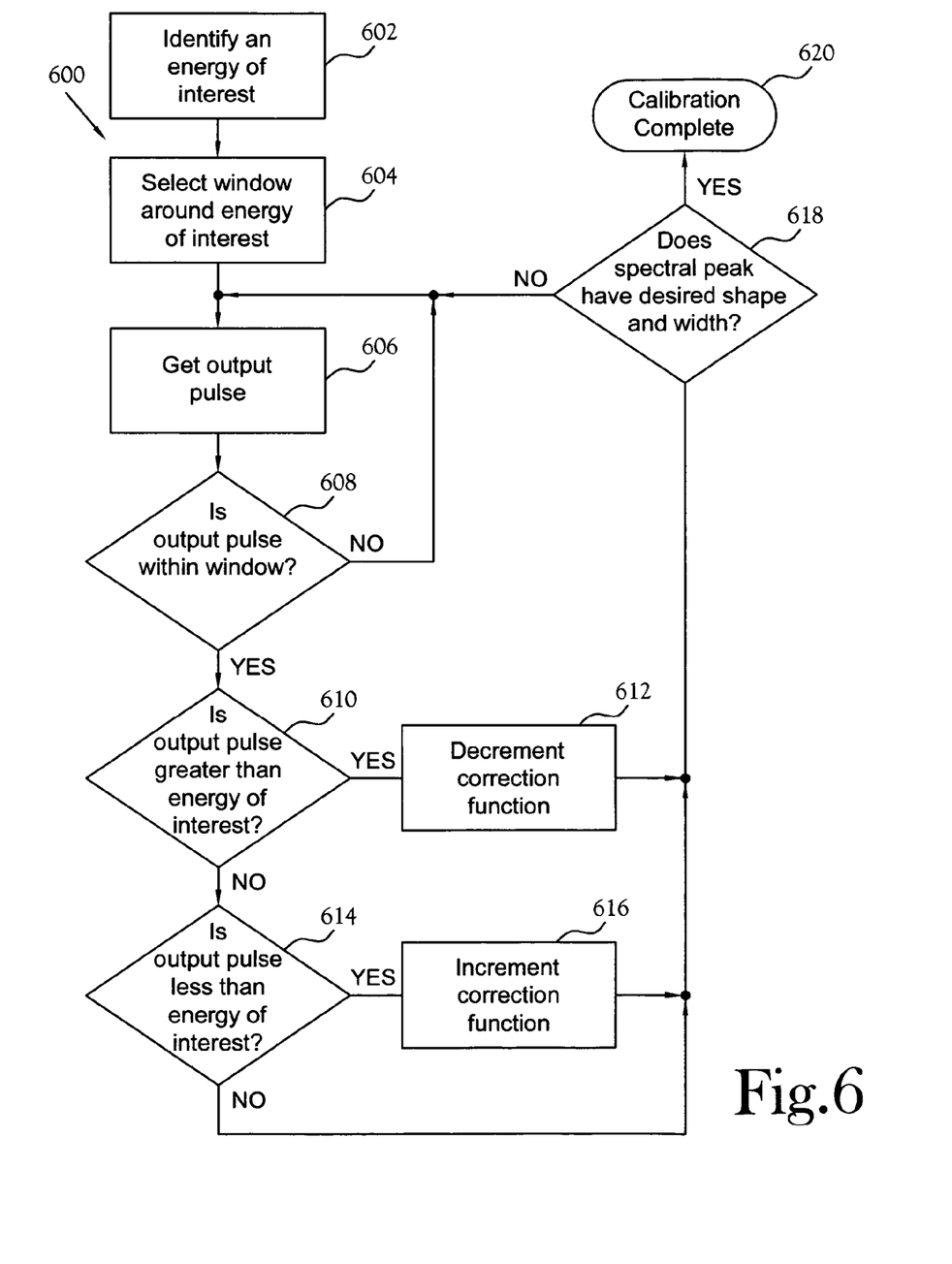
FIG. 6 is a flow chart of the method by which the charge-carrier-trapping correction function of the digital filter is modified to improve the energy resolution of the charge-trapping correcting spectrometer.

FIG. 6 is a flow chart of the method 600 by which the charge-carrier-trapping correction function of the digital filter is modified to improve the energy resolution of the charge-trapping correcting spectrometer. Initially, the histogram is analyzed to identify the location of a spectral peak representing a radioactive element found in the source, thereby identifying the responsible element in step 602. For example, a radiation source containing Cesium-137 (137 Cs) produces pulses centered around 662 keV. Because of charge-carrier trapping and noise, there some pulses show up at energy values close to but less than or greater than 662 keV. The energy of interest is determined to be the known energy value corresponding to the identified element identified by the clustered pulses. Next, a window around the energy of interest is selected in step 604. For example, a 4 keV window centered around 662 keV (662±2 keV) is selected to capture pulses produces by 137 Cs but offset due to charge-carrier trapping and noise. The width of the window is selected based upon criteria such as the proximity of spectral peak produced by other elements and the magnitude of the offsets. The output of the digital filter 504 is a digital representation of an output pulse collected by the detector 102 and the output of the pulse shape analyzer 402 and is obtained in step 606. If the output lies within the selected energy window then the output pulse is used to modify the charge-carrier-trapping correction function in step 608. When the output peaks at an energy value greater than the energy of interest in step 610, the value of the charge-carrier-trapping correction function corresponding to the output of the pulse shape analyzer 402 is decremented, which shifts the output pulse back towards the correct energy, in step 612. Similarly, when the output pulse peaks at an energy value less than the energy of interest in step 614, the value of charge-carrier-trapping correction function corresponding to the output of the pulse shape analyzer 402 for that energy is incremented, which shifts the output pulse towards the correct energy in step 616. The method is repeated using additional output pulses until the charge-carrier-trapping correction function produces a spectral peak having a minimum width and a substantially symmetrical shape in step 618. Once the charge-carrier-trapping correction function has been adjusted, the calibration is complete in step 620 for the detector and future measurements made by the charge-trapping correcting spectrometer 500 with the calibrated detector will be corrected to reduce the effects of charge carrier trapping. The charge-carrier-trapping correction function remains associated with the detector used to generate it.

For the embodiment of the charge-trapping correcting spectrometer 500 including the automatic optimization circuit 502, adjustments to the charge-carrier-trapping correction function is performed by the automatic optimization circuit 502. In the manual version of the charge-trapping correcting spectrometer 400, adjustments to the charge carrier trapping function are made by the operator.

A spectrometer having improved energy resolution by correcting for error introduced by charge carrier trapping has been shown and described. The spectrometer includes a pulse shape analyzer producing an output utilized by a digital filter to reduce or eliminate the error introduced by charge carrier trapping. The digital filter of charge trapping correcting spectrometer is adjusted until the spectral peaks have a width and shape matching the desired characteristics, which are a minimum width and a substantially symmetrical shape. By correcting for the energy loss associated with long rise time events, the charge-trapping correcting spectrometer produces spectral peaks with improved energy resolution. Adding an automatic optimizer that monitors the output of the digital filter and applying a fine gain control to individual pulses corresponding to particular rise-times results in improved energy resolution and eliminates the need for manual adjustment of the digital filter by an operator.

The examples described herein make reference to the specific example of gamma-ray spectrometers using germanium detectors. It will be recognized by those skilled in the art that the method of charge-trapping correction applies to other types of detectors in which the output response depends on the pulse shape including gamma ray spectrometers using other types of detectors.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having described the invention, what is claimed is:

1. A gamma-ray spectrometer having an improved energy resolution by reducing charge-carrier-trapping effects in a detector, said gamma-ray spectrometer comprising:

a detector responsive to gamma-ray radiation emitted from a gamma-ray radiation source, said detector for producing a detector output corresponding to absorbed gamma-ray radiation, said detector output having a pulse shape;

an analog-to-digital converter in communication with said detector, said analog-to-digital converter for producing a digital output representing said detector output;

a pulse shape analyzer circuit in communication with said analog-to-digital converter, said pulse shape analyzer circuit for analyzing said digital output and for producing an analyzer output characteristic of said pulse shape of said detector output; and a digital filter in communication with said analog-to-digital converter and said pulse shape analyzer circuit, said digital filter for applying a charge-carrier-trapping correction function to said digital output, said charge-carrier-trapping correction function being dependent upon said analyzer output, said digital filter for producing a filter output proportional to said detector output and modified by said analyzer output.

2. The gamma-ray spectrometer of claim 1 wherein said detector output has a rise time, said analyzer output being a number proportional to said rise time of said detector output.

3. The gamma-ray spectrometer of claim 1 wherein said charge-carrier-trapping correction function is a set of gain factors, each of said set of gain factors being associated with a selected rise time.

4. The gamma-ray spectrometer of claim 1 wherein said detector has a set of characteristics, said gamma-ray spectrometer further comprising an automatic optimizer circuit in communication with said pulse shape analyzer circuit and said digital filter, said automatic optimizer circuit for modifying said charge-carrier-trapping correction function to match said set of characteristics of said detector.

5. The gamma-ray spectrometer of claim 1 further comprising an automatic optimizer circuit, said charge-carrier trapping correction function comprising a set of gain factors, each of said set of gain factors corresponding to a rise time, and said analyzer output being a number proportional to a rise time of said detector output, said automatic optimizer circuit for adjusting one of said set of gain factors corresponding to said analyzer output.

6. The gamma-ray spectrometer of claim 1 further comprising an automatic optimizer circuit in communication with said pulse shape analyzer circuit and said digital filter, said automatic optimizer circuit for performing a method of minimizing a width of a spectral peak, said method comprising the steps of:

(a) receiving a selected said filter output falling within a selected energy window corresponding to an energy of interest;

(b) receiving said analyzer output corresponding to said selected filter output;

(c) incrementing a value of said charge-carrier-trapping correction function corresponding to said analyzer output for said selected filter output when said selected filter output occurs at an energy value less than said energy of interest;

(d) decrementing a value of said charge-carrier-trapping correction function corresponding to said analyzer output for said selected filter output when said selected filter output occurs at an energy value greater than said energy of interest;

(e) repeating said step (a) through said step (d) until said charge-carrier-trapping correction function produces a spectral peak having a minimal width; and (f) associating said charge-carrier-trapping correction function with said detector.

7. The gamma-ray spectrometer of claim 1 further comprising an automatic optimizer circuit in communication with said pulse shape analyzer circuit and said digital filter, said automatic optimizer circuit for modifying said charge-carrier-trapping correction function until said charge-carrier-trapping correction function produces a spectral peak having a minimal width by incrementing said charge-carrier-trapping correction function corresponding to said analyzer output for a selected filter output when said selected filter output occurs at an energy value less than said energy of interest and decrementing a value of said charge-carrier-trapping correction function corresponding to said analyzer output for said selected filter output when said selected filter output occurs at an energy value greater than said energy of interest, said automatic optimizer circuit for associating said charge-carrier-trapping correction function with said detector.

8. The gamma-ray spectrometer of claim 1 further comprising a program storage device readable by automatic optimizer circuit, said program storage device tangibly embodying a program of instructions executable by said automatic optimizer circuit to perform a method of minimizing a width of a spectral peak, said method comprising the steps of:
  (a) receiving a selected said filter output falling within a selected energy window corresponding to an energy of interest;
  (b) receiving said analyzer output corresponding to said selected filter output;
  (c) incrementing a value of said charge-carrier-trapping correction function corresponding to said analyzer output for said selected filter output when said selected filter output occurs at an energy value less than said energy of interest;
  (d) decrementing a value of said charge-carrier-trapping correction function corresponding to said analyzer output for said selected filter output when said selected filter output occurs at an energy value greater than said energy of interest;
  (e) repeating said step (a) through said step (d) until said charge-carrier-trapping correction function produces a spectral peak having a minimal width; and
  (f) associating said charge-carrier-trapping correction function with said detector.

9. The gamma-ray spectrometer of claim 1 further comprising an automatic optimizer circuit for examining said filter output of said digital filter and for modifying said charge-carrier-trapping correction function to minimize a width of a peak within said pulse shape analyzer output.

10. The gamma-ray spectrometer of claim 1 wherein said detector is a Germanium detector subject to charge carrier trapping losses.

11. A gamma-ray spectrometer having an improved energy resolution by reducing charge-carrier-trapping effects in a detector, said gamma-ray spectrometer comprising:
  a detector responsive to gamma-ray radiation emitted from a gamma-ray radiation source, said detector for producing a detector output corresponding to absorbed gamma-radiation, said detector output having a pulse shape;
  an analog-to-digital converter in communication with said detector, said analog-to-digital converter for producing a digital output representing said detector output;
  a pulse shape analyzer circuit in communication with said analog-to-digital converter, said pulse shape analyzer circuit for analyzing said digital output and for producing an analyzer output characteristic of said pulse shape of said detector output; and
  a digital filter in communication with said analog-to-digital converter and said pulse shape analyzer circuit, said digital filter for applying a charge-carrier-trapping correction function using said analyzer output, said digital filter for producing a filter output proportional to said detector output and modified by said pulse shape analyzer; and
  an automatic optimizer circuit in communication with said pulse shape analyzer and said digital filter, said automatic optimizer circuit for modifying said charge-carrier-trapping correction function based upon said analyzer output and said filter output.

12. The gamma-ray spectrometer of claim 11 wherein said detector output has a rise time, said analyzer output being a number proportional to said rise time of said detector output.

13. The gamma-ray spectrometer of claim 11 wherein said charge-carrier-trapping correction function is a set of gain factors, each of said set of gain factors being associated with a selected rise time.

14. The gamma-ray spectrometer of claim 11 wherein said detector has a set of characteristics, said automatic optimizer circuit for modifying said charge-carrier-trapping correction function to match said set of characteristics of said detector.

15. The gamma-ray spectrometer of claim 11 wherein said charge-carrier trapping correction function comprises a set of gain factors, each of said set of gain factors corresponding to a selected rise time, and wherein said analyzer output is a number proportional to a rise time of said detector output, said automatic optimizer circuit for adjusting one of said set of gain factors corresponding to said analyzer output.

16. The gamma-ray spectrometer of claim 11 wherein said automatic optimizer circuit performs a method of minimizing a width of a spectral peak, said method comprising the steps of:
  (a) receiving a selected said filter output falling within a selected energy window corresponding to an energy of interest;
  (b) receiving said analyzer output corresponding to said selected filter output;
  (c) incrementing a value of said charge-carrier-trapping correction function corresponding to said analyzer output for said selected filter output when said selected filter output occurs at an energy value less than said energy of interest;
  (d) decrementing a value of said charge-carrier-trapping correction function corresponding to said analyzer output for said selected filter output when said selected filter output occurs at an energy value greater than said energy of interest;
  (e) repeating said step (a) through said step (d) until said charge-carrier-trapping correction function produces a spectral peak having a minimal width; and
  (f) associating said charge-carrier-trapping correction function with said detector.

17. The gamma-ray spectrometer of claim 11 further comprising an automatic optimizer circuit in communication with said pulse shape analyzer circuit and said digital filter, said automatic optimizer circuit for modifying said charge-carrier-trapping correction function until said charge-carrier-trapping correction function produces a spectral peak having a minimal width by incrementing said charge-carrier-trapping correction function corresponding to said analyzer output for a selected filter output when said selected filter output occurs at an energy value less than said energy of interest and decrementing a value of said charge-carrier-trapping correction function corresponding to said analyzer output for said selected filter output when said selected filter output occurs at an energy value greater than said energy of interest, said automatic optimizer circuit for associating said charge-carrier-trapping correction function with said detector.

18. The gamma-ray spectrometer of claim 11 further comprising a program storage device readable by automatic optimizer circuit, said program storage device tangibly embodying a program of instructions executable by said automatic optimizer circuit to perform a method of minimizing a width of a spectral peak, said method comprising the steps of:
  (a) receiving a selected said filter output falling within a selected energy window corresponding to an energy of interest;
  (b) receiving said analyzer output corresponding to said selected filter output;
  (c) incrementing a value of said charge-carrier-trapping correction function corresponding to said analyzer output for said selected filter output when said selected filter output occurs at an energy value less than said energy of interest;
  (d) decrementing a value of said charge-carrier-trapping correction function corresponding to said analyzer output for said selected filter output when said selected filter output occurs at an energy value greater than said energy of interest;
  (e) repeating said step (a) through said step (d) until said charge-carrier-trapping correction function produces a spectral peak having a minimal width; and
  (f) associating said charge-carrier-trapping correction function with said detector.

19. The gamma-ray spectrometer of claim 11 wherein said automatic optimizer circuit examines said filter output of said digital filter and modifies said charge-carrier-trapping correction function to minimize a width of a peak within said pulse shape analyzer output.

20. The gamma-ray spectrometer of claim 11 wherein said detector is a Germanium detector subject to charge carrier trapping losses.

* * * * *